(12) United States Patent
Fukuda

(10) Patent No.: US 9,816,395 B2
(45) Date of Patent: Nov. 14, 2017

(54) TURBINE HOUSING

(71) Applicant: Takanori Fukuda, Miyoshi (JP)

(72) Inventor: Takanori Fukuda, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 267 days.

(21) Appl. No.: 14/443,850

(22) PCT Filed: Nov. 22, 2013

(86) PCT No.: PCT/JP2013/081528
§ 371 (c)(1),
(2) Date: May 19, 2015

(87) PCT Pub. No.: WO2014/091905
PCT Pub. Date: Jun. 19, 2014

(65) Prior Publication Data
US 2015/0300203 A1     Oct. 22, 2015

(30) Foreign Application Priority Data

Dec. 10, 2012   (JP) ................................. 2012-269431

(51) Int. Cl.
*F01D 25/14* (2006.01)
*F01D 25/12* (2006.01)
(Continued)

(52) U.S. Cl.
CPC ............ *F01D 25/14* (2013.01); *F01D 25/12* (2013.01); *F01D 25/24* (2013.01); *F01D 25/30* (2013.01);
(Continued)

(58) Field of Classification Search
CPC .......... F01D 25/14; F01D 25/26; F01D 9/026; F05D 2220/40; Y02T 10/144; F01P 2060/12
(Continued)

(56) References Cited

U.S. PATENT DOCUMENTS 4,068,612 A * 1/1978 Meiners .................... F02C 6/12
440/89 C
9,097,121 B2 * 8/2015 Joergl ..................... F01D 9/026
(Continued)

FOREIGN PATENT DOCUMENTS

DE    102010038909 A1 * 2/2012 ............. F01D 9/026
DE WO 2012107479 A1 * 8/2012 ............. F01D 25/14
(Continued)

OTHER PUBLICATIONS

English translation of DE 102010038909.*
(Continued)

*Primary Examiner* — Woody Lee, Jr.
*Assistant Examiner* — Topaz L Elliott
(74) *Attorney, Agent, or Firm* — Oliff PLC

(57) ABSTRACT

A turbine housing includes a scroll passage, a medium passage, an exhaust introduction passage, and a partition wall. The scroll passage extends spirally and is located outside a turbine wheel. The scroll passage includes a spiral beginning and a spiral end. The exhaust introduction passage is connected to the spiral beginning and introduces the exhaust into the scroll passage. The partition wall is located between the spiral end and the exhaust introduction passage and extends in the circumferential direction of the turbine wheel. The medium passage includes a start section that includes an adjacent portion. The adjacent portion is adjacent to the partition wall in the direction of the rotation axis (Continued)

of the turbine wheel. The start section includes an inlet that introduces the cooling medium into the medium passage.

6 Claims, 5 Drawing Sheets

(51) Int. Cl.
    *F02B 39/00*       (2006.01)
    *F01D 25/30*       (2006.01)
    *F01D 25/24*       (2006.01)
    *F02B 37/00*       (2006.01)

(52) U.S. Cl.
    CPC .............. *F02B 37/00* (2013.01); *F02B 39/00* (2013.01); *F02B 39/005* (2013.01); *F05D 2220/40* (2013.01); *F05D 2260/232* (2013.01); *Y02T 10/144* (2013.01)

(58) Field of Classification Search
    USPC .................................. 415/203, 204, 205, 206
    See application file for complete search history.

(56) References Cited

U.S. PATENT DOCUMENTS 9,512,739 B2 * 12/2016 Bogner ................... F01D 25/14
9,518,479 B2 * 12/2016 Joergl ..................... F01D 25/14
2011/0154818 A1   6/2011 Takahata
2012/0201655 A1 * 8/2012 Kusakabe ............... F01D 9/026
                                                                     415/116
2013/0287560 A1 * 10/2013 Osako ..................... F01D 9/026
                                                                     415/204

FOREIGN PATENT DOCUMENTS

| | | | |
|---|---|---|---|
| DE | WO 2012125385 A2 * | 9/2012 | ............ F01D 25/14 |
| JP | S62-26328 A | 2/1987 | |
| JP | H07-49036 A | 2/1995 | |
| JP | 2004-353589 A | 12/2004 | |
| JP | 2008-267257 A | 11/2008 | |
| JP | 2010-059807 A * | 3/2010 | |
| JP | WO 2012086423 A1 * | 6/2012 | ............ F01D 9/026 |
| KR | 101038369 * | 6/2011 | ............ F01D 25/08 |

OTHER PUBLICATIONS

Additional English translation of JP 2004-353589 via Espacenet.*
English translation of KR 101038369.*
Partial Translation of Feb. 2, 2016 Office Action issued in Japanese Patent Application No. 2012269431.

* cited by examiner

TURBINE HOUSING

TECHNICAL FIELD

The present disclosure relates to a turbine housing that includes a medium passage through which a cooling medium, such as engine coolant, flows.

BACKGROUND ART

An internal combustion engine often includes a turbocharger that is driven by exhaust. Japanese Laid-Open Patent Publication No. 2008-267257 describes a turbine housing that is a part of such a turbocharger. An outer shell covers the outer surface of the turbine housing, and engine coolant is supplied to the clearance between the outer surface of the housing and the outer shell. The clearance functions as a medium passage, which is supplied with coolant that cools the turbine housing through heat exchange.

PRIOR ART DOCUMENTS

Patent Documents

Patent Document 1: Japanese Laid-Open Patent Publication No. 2008-267257

SUMMARY OF THE INVENTION

Problems that the Invention is to Solve

When the turbocharger is operated, the amount of heat that turbine housing receives from exhaust is not uniform and varies in different parts. In the structure described in Patent Document 1, the medium passage substantially covers the entire outer surface of the turbine housing to cool the entire turbine housing. Thus, the structure fails to effectively cool the entire turbine housing according to the temperature of each part of the turbine housing. For example, a part of the turbine housing that receives less heat from exhaust may be cooled excessively, or a part that receives more heat may be insufficiently cooled by the engine coolant.

It is an object of the present disclosure to provide a turbine housing that can be adequately cooled as a whole.

Means for Solving the Problems

To achieve the foregoing objective and in accordance with one aspect of the present invention, a turbine housing is provided that includes a scroll passage, a medium passage, an exhaust introduction passage, and a partition wall. The scroll passage extends spirally and is located outside a turbine wheel. Exhaust of an internal combustion engine that is to be blown onto the turbine wheel flows through the scroll passage, and the scroll passage includes a spiral beginning and a spiral end. A cooling medium flows through the medium passage. The exhaust introduction passage is connected to the spiral beginning and introduces the exhaust into the scroll passage. The partition wall extends between the spiral end and the exhaust introduction passage and in a circumferential direction of the turbine wheel. The medium passage includes a start section that includes an adjacent portion, wherein the adjacent portion is adjacent to the partition wall in a direction of an rotation axis of the turbine wheel. The start section includes an inlet that introduces the cooling medium into the medium passage.

MODES FOR CARRYING OUT THE INVENTION

A turbine housing according to one embodiment will now be described.

Figure 1:
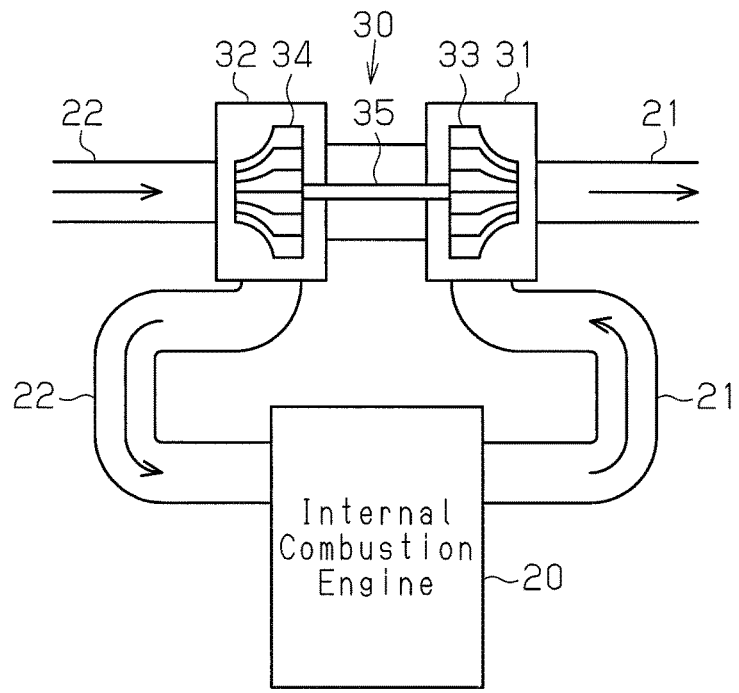
FIG. 1 is a schematic view showing the structure of a turbocharger including a turbine housing according to one embodiment.

As shown in FIG. 1, a turbocharger 30 includes a turbine 31, which is coupled to an exhaust passage 21 of an internal combustion engine 20, and a compressor 32, which is coupled to an intake passage 22 of the internal combustion engine 20. A turbine wheel 33 is located in the turbine 31, and a compressor wheel 34 is arranged in the compressor 32. The turbine wheel 33 and the compressor wheel 34 are coupled to each other by a shaft 35 to be integrally rotational.

In the turbocharger 30, operation of the internal combustion engine 20 causes exhaust to be blown onto the turbine wheel 33 and causes the turbine wheel 33 and the compressor wheel 34 to rotate integrally. This presses and forcibly delivers the intake air flowing in the intake passage 22 into the cylinders of the internal combustion engine 20.

Figure 2:
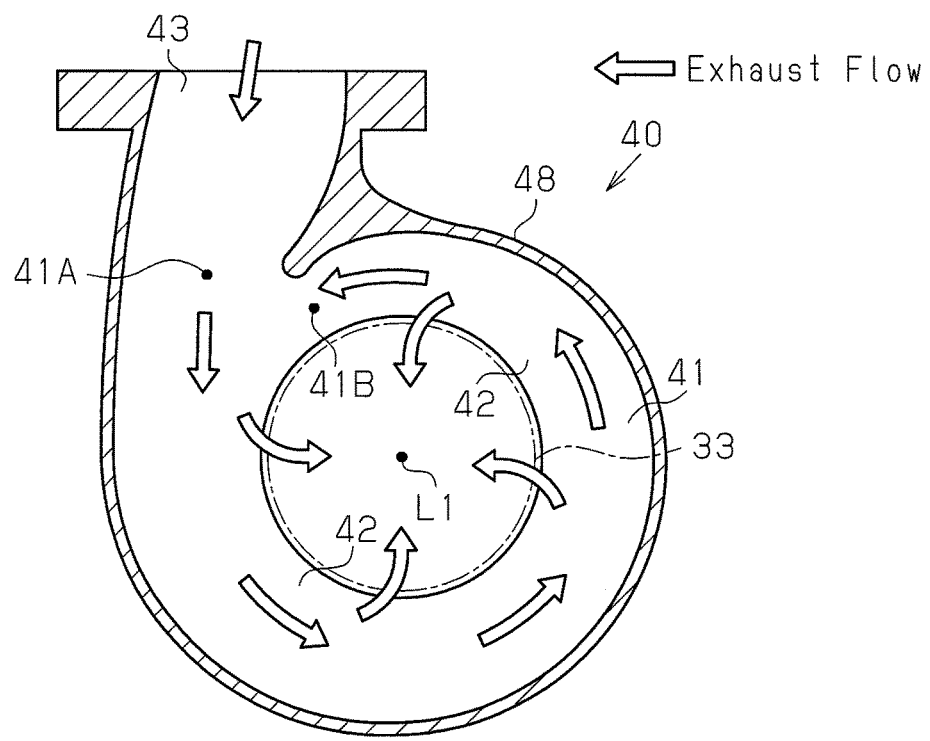
FIG. 2 is a cross-sectional view showing the turbine housing.

As shown in FIG. 2, a turbine housing 40 of the turbine 31 includes a scroll passage 41 that extends spirally around a rotation axis L1 of the turbine wheel 33 and is located on the radially outside the turbine wheel 33. An opening (slit 42) extends over the entire circumference of the radially inner section of the scroll passage 41. The exhaust in the scroll passage 41 is blown onto the turbine wheel 33 through the slit 42. The hollow arrows in FIG. 2 indicate the flow of exhaust.

The scroll passage 41 includes a spiral beginning 41A and a spiral end 41B. The spiral beginning 41A is connected to an exhaust introduction passage 43, which introduces exhaust into the scroll passage 41 from the exhaust passage 21. The turbine housing 40 includes a tongue-shaped partition wall 44 located at the junction of the spiral end 41B of the scroll passage 41 and the exhaust introduction passage 43. The partition wall 44 extends from the inner wall of the turbine housing 40 and in the circumferential direction of the turbine wheel 33 to separate the passage 41 from the passage 43.

Figure 3:
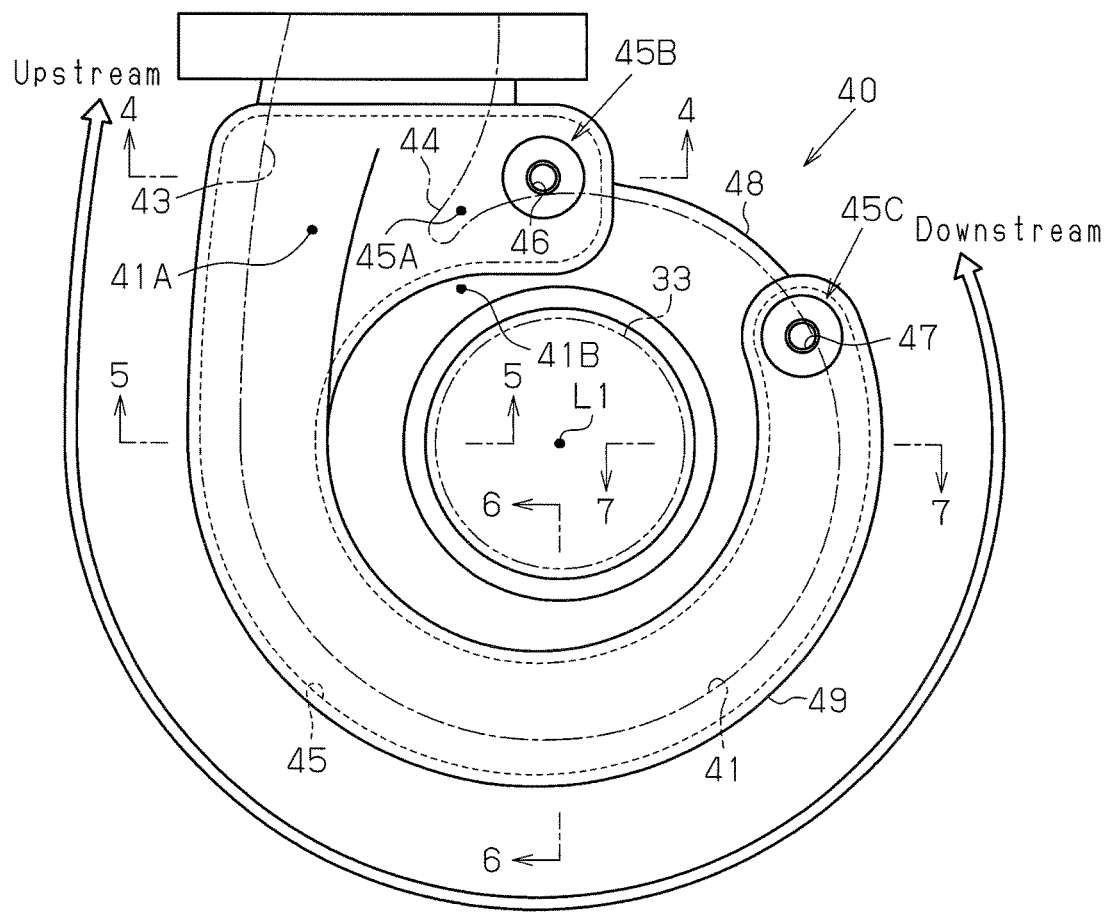
FIG. 3 is a plan view showing the turbine housing.

As shown in FIG. 3, the turbine housing 40 includes a water jacket 45 that cools the turbine housing 40. The water jacket 45 extends along the exhaust introduction passage 43 and the scroll passage 41. The water jacket 45 effectively cools the part in which the exhaust introduction passage 43 and the scroll passage 41 are located, that is, the part through which exhaust flows and that receives a large amount of heat from the exhaust. One end of the water jacket 45 in the extending direction (direction indicated by the hollow arrow in FIG. 3) includes an inlet 46, which introduces a cooling medium (coolant for cooling the internal combustion engine 20 in the present embodiment) into the water jacket 45. The other end of the water jacket 45 includes an outlet 47, which discharges the coolant out of the water jacket 45. The coolant flows from the inlet 46 to the outlet 47 in the water jacket 45. In the present embodiment, the heat exchange between the turbine housing 40 and the coolant flowing in the water jacket 45 cools the turbine housing 40.

Figure 4:
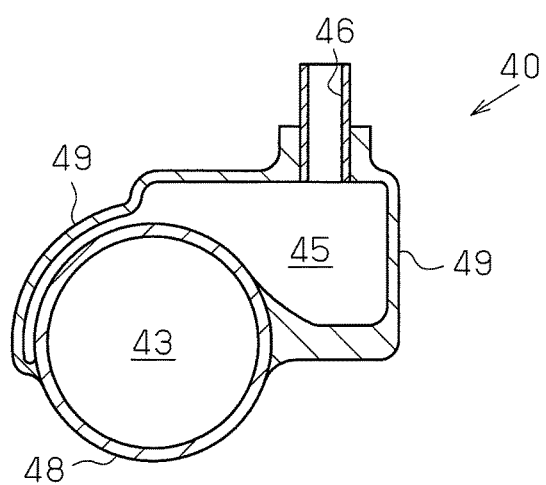
FIG. 4 is a cross-sectional view taken along line 4-4 in FIG. 3.
Figure 5:
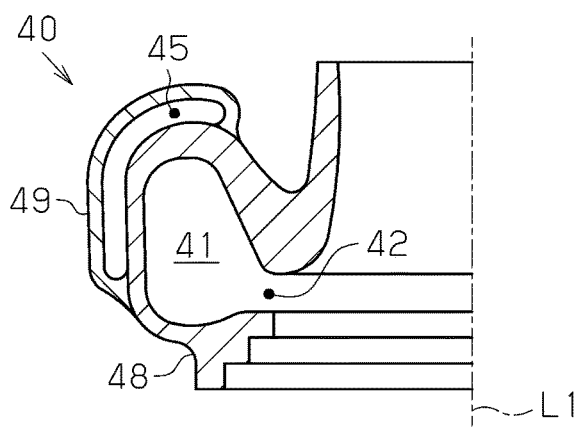
FIG. 5 is a cross-sectional view taken along line 5-5 in FIG. 3.
Figure 6:
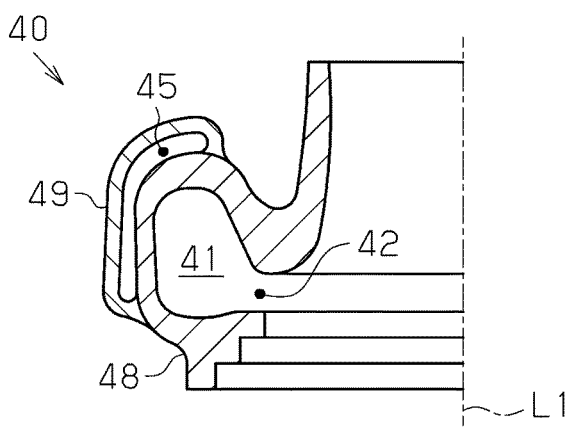
FIG. 6 is a cross-sectional view taken along line 6-6 in FIG. 3.
Figure 7:
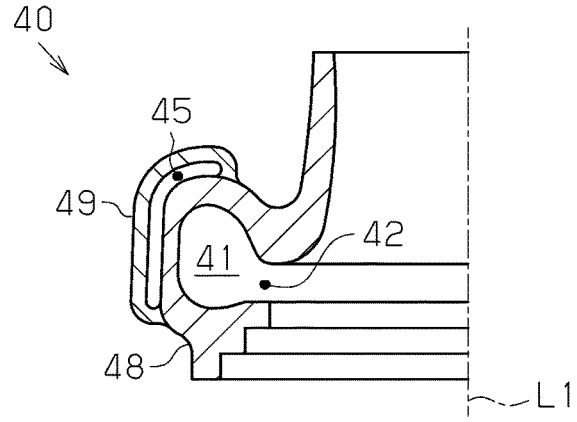
FIG. 7 is a cross-sectional view taken along line 7-7 in FIG. 3.

As shown in FIGS. 4 to 7, the turbine housing 40 includes a housing main body 48, which includes the exhaust introduction passage 43 and the scroll passage 41, and a jacket portion 49, which is a part of the outer wall of the water jacket 45. FIG. 4 is a cross-sectional view of the turbine housing 40 taken along line 4-4 in FIG. 3, FIG. 5 is a cross-sectional view taken along line 5-5 in FIG. 3, FIG. 6 is a cross-sectional view taken along line 6-6 in FIG. 3, and FIG. 7 is a cross-sectional view taken along line 7-7 in FIG. 3. The housing main body 48 and the jacket portion 49 are formed separately by casting, for example. The jacket portion 49 is jointed to the housing main body 48 by welding or the like to form the turbine housing 40.

During operation of the turbocharger 30, the amount of heat that turbine housing 40 receives from exhaust is not uniform and varies in different parts of the turbine housing 40.

As shown in FIGS. 2 and 3, the turbine housing 40 includes the partition wall 44, which extends between the spiral end 41B of the scroll passage 41 and the exhaust introduction passage 43 in the circumferential direction of the turbine wheel 33. The partition wall 44 receives heat from exhaust on both of the surface that faces the exhaust introduction passage 43 and the surface that faces the scroll passage 41. In addition, the part of the partition wall 44 that is connected to another part, that is, the part that transmits heat to another part, has a small cross-sectional area. Thus, the partition wall 44 tends to be heated to a high temperature, and the temperature rise tends to deteriorate the reliability of the partition wall 44.

If the supply amount of the coolant is set to sufficiently cool the partition wall 44, other parts with lower temperature may be cooled excessively. This may unduly increase the load on the water pump that discharges the coolant.

Since the turbine housing 40 is cooled by heat exchange with the coolant flowing in the water jacket 45, the part where the coolant has a lower temperature is cooled to a greater degree. In the vicinity of the inlet 46, which introduces the coolant into the water jacket 45, the coolant is hardly subjected to heat exchange and thus has a lower temperature.

Accordingly, the water jacket 45 of the present embodiment is structured as follows.

The water jacket 45 includes a start section 45B and an end section 45C in the extending direction of the water jacket 45. The start section 45B includes a part that is adjacent to the partition wall 44 in the direction of the rotation axis L1 of the turbine wheel 33, namely, an adjacent portion 45A. Further, the start section 45B includes the inlet 46. Specifically, the inlet 46 is located upstream in the flow direction of coolant in the water jacket 45 (hereinafter only referred to as "upstream") of the adjacent portion 45A. The end section 45C includes the outlet 47, which discharges coolant from the water jacket 45. The water jacket 45 extends from the start section 45B to the end section 45C in the flow direction of exhaust in the scroll passage 41.

In the turbine housing 40, coolant is introduced into the adjacent portion 45A and its vicinity in the water jacket 45. This allows the partition wall 44 and its vicinity, which are heated to a higher temperature than other parts of the turbine housing 40, to be cooled by coolant of a lower temperature. Moreover, the part of the turbine housing 40 that is apart from the partition wall 44, that is, the part that is less likely to be heated to a high temperature, is cooled by the coolant that has cooled the partition wall 44 and its vicinity. Accordingly, the entire turbine housing 40 can be cooled adequately according to the temperature of each part.

In the turbine housing 40, coolant is introduced in a position of the water jacket 45 that is located upstream of the adjacent portion 45A of the water jacket 45. This allows the coolant entering through the inlet 46 to flow smoothly in one direction in the adjacent portion 45A, thereby cooling the adjacent portion 45A in a preferred manner.

Heat exchange with the turbine housing 40 increases the temperature of the coolant in the water jacket 45. Thus, the temperature of the coolant increases as the coolant flows downstream in the flow direction (hereinafter referred only as "downstream"). Thus, the cooling effect of the coolant tends to decrease in the downstream direction.

Accordingly, in the present embodiment, the passage cross-sectional area of the water jacket 45 decreases from the inlet 46 toward the outlet 47. More specifically, the water jacket 45 is shaped to satisfy the relationship S1>S2>S3>S4, where S1 represents the passage cross-sectional area of the water jacket 45 shown in FIG. 4, S2 represents the passage cross-sectional area shown in FIG. 5, S3 represents the passage cross-sectional area shown in FIG. 6, and S4 represents the passage cross-sectional area shown in FIG. 7, in order from the inlet 46 in the extending direction of the water jacket 45.

In the turbine housing 40, the cross-sectional area of the water jacket 45 decreases from the inlet 46 toward the outlet 47, in other words, in the downstream direction. This increases the flow velocity of the coolant in the downstream direction. Thus, in a downstream section, where the coolant has a higher temperature, the flow velocity of the coolant is increased, thereby increasing the rate of heat transfer from the turbine housing 40 to the coolant. This limits variation in the degrees of cooling in difference parts of the turbine housing 40 and cools the entire turbine housing 40 in a preferred manner.

The above illustrated embodiment achieves the following advantages.

(1) The start section 45B of the water jacket 45 includes the adjacent portion 45A, which is adjacent to the partition wall 44 in the direction of the rotation axis L1 of the turbine wheel 33. Further, the start section 45B includes the inlet 46. Thus, the entire turbine housing 40 can be cooled adequately according to the temperature of each part.

(2) The water jacket 45 extends along the scroll passage 41. This effectively cools the part in which the scroll passage 41 is provided, that is, the part through which exhaust flows and that receives a large amount of heat from the exhaust.

(3) The passage cross-sectional area of the water jacket 45 decreases from the inlet 46 toward the outlet 47. This limits variation in the degrees of cooling in difference parts of the turbine housing 40, thereby cooling the entire turbine housing 40 in a preferred manner.

The above illustrated embodiment may be modified as follows.

The passage of the water jacket 45 may have any shape. For example, the passage cross-sectional area may be substantially identical in all parts, or the passage cross-sectional area may gradually increase from the inlet 46 toward the outlet 47.

As long as the water jacket 45 extends from the adjacent portion 45A, which is adjacent to the partition wall 44, or its vicinity, the water jacket 45 does not have to extend along the scroll passage 41 and may extend in any shape.

The inlet may be formed such that the incoming coolant is directed to the adjacent portion 45A, which is adjacent to the partition wall 44. Alternatively, the inlet may be formed such that the incoming coolant is directed to a part slightly downstream of the adjacent portion 45A, which is adjacent to the partition wall 44.

The housing main body 48 and the jacket portion 49 may be formed integrally through casting, for example.

Figure 8:
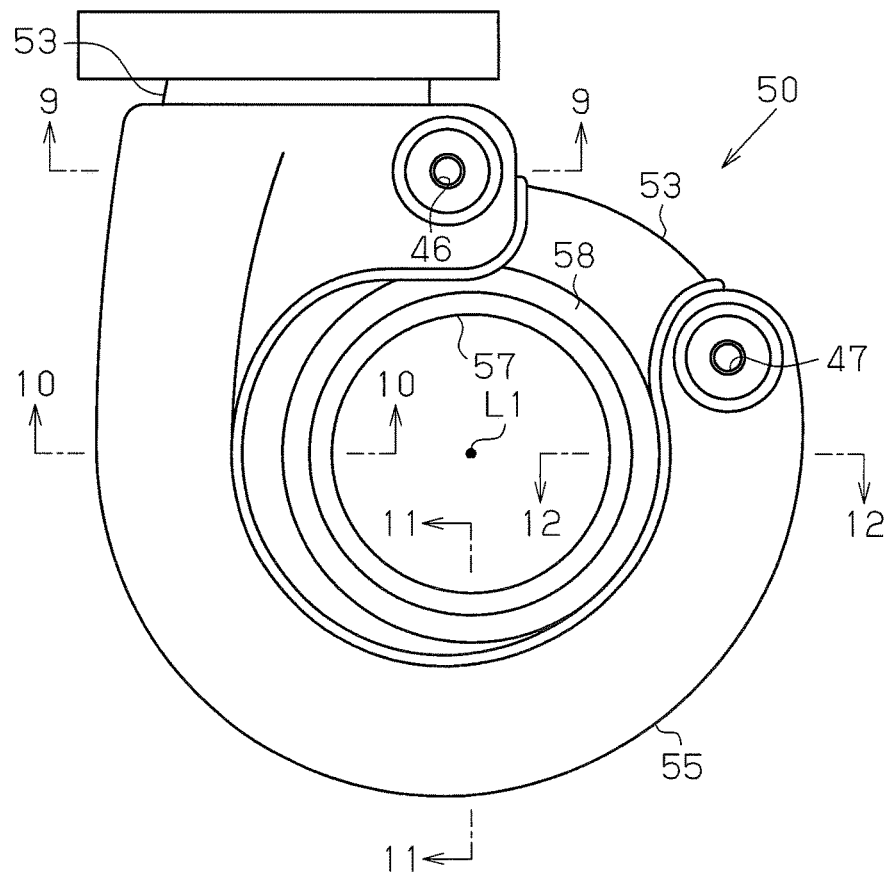
FIG. 8 is a plan view showing a turbine housing according to another embodiment.
Figure 9:
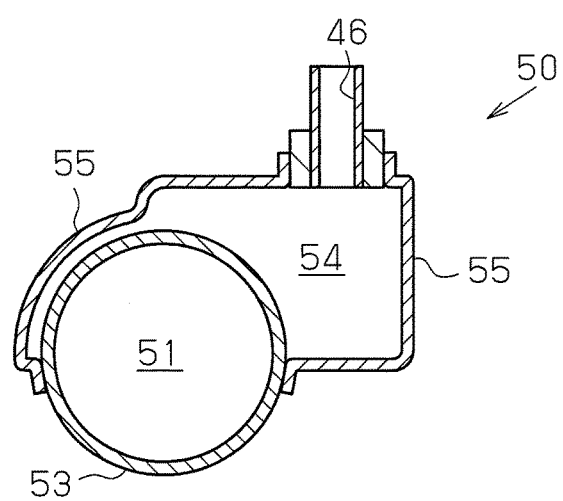
FIG. 9 is a cross-sectional view taken along line 9-9 in FIG. 8.
Figure 10:
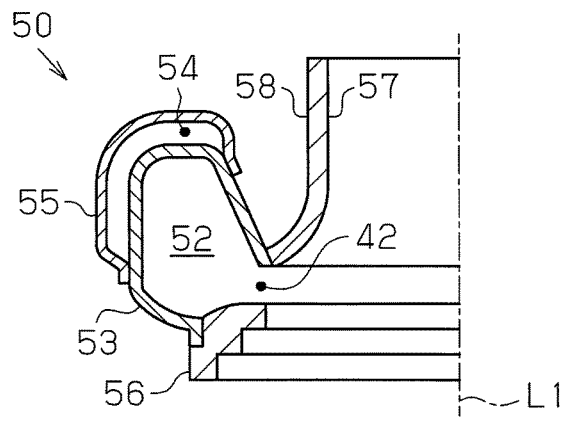
FIG. 10 is a cross-sectional view taken along line 10-10 in FIG. 8.
Figure 11:
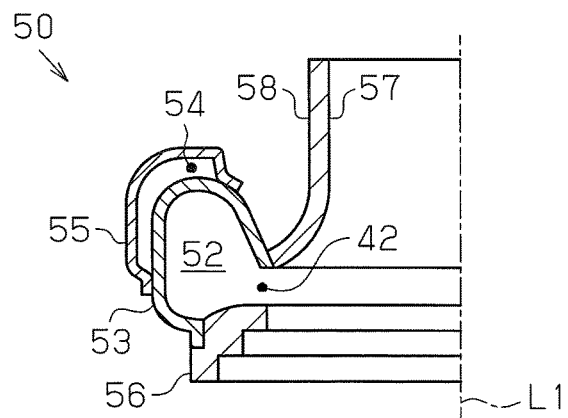
FIG. 11 is a cross-sectional view taken along line 11-11 in FIG. 8.
Figure 12:
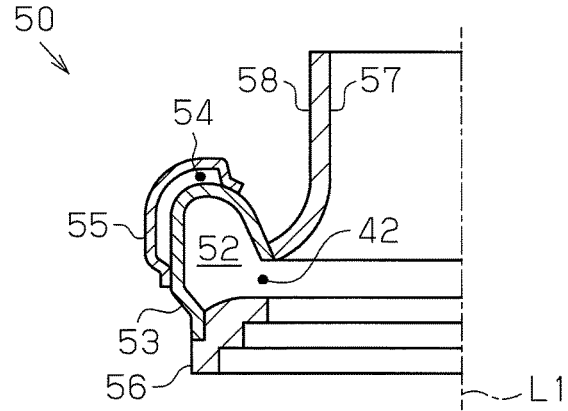
FIG. 12 is a cross-sectional view taken along line 12-12 in FIG. 8.

As shown in FIGS. 8 to 12, a turbine housing 50 may include a scroll portion 53, which is a part of an exhaust introduction passage 51 and a scroll passage 52, a jacket portion 55, which is a part of a water jacket 54, a first housing portion 56, which is on the compressor side of a slit 42, and a second housing portion 58, which forms a shroud portion 57. The scroll portion 53 and the jacket portion 55 of the turbine housing 50 may be formed through casting or plate metal processing. FIG. 9 is a cross-sectional view of the turbine housing 50 taken along line 9-9 in FIG. 8, FIG. 10 is a cross-sectional view taken along line 10-10 in FIG. 8, FIG. 11 is a cross-sectional view taken along line 11-11 in FIG. 8, and FIG. 12 is a cross-sectional view taken along line 12-12 in FIG. 8.

The turbine housing of the above embodiments is not limited to a structure to which some of the coolant that cools the internal combustion engine 20 is supplied as a cooling medium that cools the turbine housing, and may be a structure that is supplied with some of the fluid (e.g., coolant or oil) that is supplied to a peripheral device of the internal combustion engine 20, and a structure that is supplied with fluid (e.g., coolant or cooling oil) that is dedicated to cooling of the turbine housing.

The invention claimed is:

1. A turbine housing comprising:
   a scroll passage that extends spirally and is located outside a turbine wheel, wherein exhaust of an internal combustion engine that is to be blown onto the turbine wheel flows through the scroll passage, and the scroll passage includes a spiral beginning and a spiral end;
   a medium passage through which a cooling medium flows;
   an exhaust introduction passage that is connected to the spiral beginning and introduces the exhaust into the scroll passage; and
   a partition wall extending between the spiral end and the exhaust introduction passage and in a circumferential direction of the turbine wheel, wherein
   the medium passage includes a start section that includes an adjacent portion, wherein the adjacent portion is adjacent to the partition wall in a direction of a rotation axis of the turbine wheel,
   the start section includes an inlet that introduces the cooling medium into the medium passage, and
   the medium passage does not fully surround the exhaust introduction passage, and an outer wall of the medium passage that contains the cooling medium traverses the exhaust introduction passage from the adjacent portion toward a radially outer portion of the turbine housing.

2. The turbine housing according to claim 1, wherein the medium passage extends along the scroll passage.

3. The turbine housing according to claim 2, wherein the medium passage extends from the start section and in a flow direction of the exhaust in the scroll passage.

4. The turbine housing according to claim 2, wherein the medium passage includes an end section, which includes an outlet that discharges the cooling medium out of the medium passage, and
   the medium passage has a passage cross-sectional area that decreases from the inlet toward the outlet.

5. The turbine housing according to claim 1, wherein the cooling medium is engine coolant.

6. The turbine housing according to claim 1, wherein the inlet is located upstream of the adjacent portion in a flow direction of the cooling medium.

* * * * *